(12) United States Patent
Christensen et al.

(10) Patent No.: US 6,330,605 B1
(45) Date of Patent: Dec. 11, 2001

(54) PROXY CACHE CLUSTER

(75) Inventors: Brent Ray Christensen, Cedar Hills; Howard Rollin Davis, Salem; Adam Lee Harral, Pleasant Grove, all of UT (US)

(73) Assignee: Volera, Inc., San Jose, CA (US)

( * ) Notice: Subject to any disclaimer, the term of this patent is extended or adjusted under 35 U.S.C. 154(b) by 0 days.

(21) Appl. No.: 09/195,982

(22) Filed: Nov. 19, 1998

(51) Int. Cl.$^7$ ................................................ G06F 15/16
(52) U.S. Cl. .......................................................... 709/226
(58) Field of Search ............................. 700/200, 203, 700/226, 233, 234, 235, 238, 239, 240, 241

(56) References Cited

U.S. PATENT DOCUMENTS

| | | | |
|---|---|---|---|
| 5,151,688 | 9/1992 | Wipfel et al. | 345/104 |
| 5,495,426 | 2/1996 | Waclawsky et al. | 365/514 |
| 5,642,511 | 6/1997 | Chow et al. | 395/701 |
| 5,784,566 | 7/1998 | Vivan et al. | 709/229 |
| 5,924,116 | 7/1999 | Aggarwal et al. | 711/122 |
| 5,950,205 | 9/1999 | Wilford et al. | 370/392 |
| 5,961,593 | 10/1999 | Gabber et al. | 709/219 |
| 5,964,891 | 10/1999 | Caswell et al. | 714/31 |
| 5,999,734 | * 12/1999 | Willis et al. | 709/200 |
| 6,014,677 | 1/2000 | Jenkins et al. | 707/501 |
| 6,018,619 | 1/2000 | Allard et al. | 709/224 |
| 6,094,708 | 7/2000 | Hilla et al. | 711/138 |
| 6,111,877 | 8/2000 | Wilford et al. | 370/392 |
| 6,112,228 | 8/2000 | Earl et al. | 709/205 |
| 6,178,160 | 1/2001 | Bolton et al. | 370/255 |
| 6,185,598 | * 2/2001 | Farber et al. | 709/200 |
| 6,185,625 | * 2/2001 | Tso et al. | 709/247 |
| 6,230,241 | 5/2001 | McKenney | 711/118 |
| 6,240,461 | 5/2001 | Cieslak et al. | 709/235 |

* cited by examiner

*Primary Examiner*—David Y. Eng
(74) *Attorney, Agent, or Firm*—Cesari and McKenna, LLP (57) ABSTRACT

A proxy cache cluster (PCC) couples to a service provider of a communications network to increase the availability of services offered by the provider to clients connected to the network. The clients access the services by issuing requests to network addresses associated with these services. The PCC increases the availability of the services by receiving and servicing those requests on behalf of the service provider in accordance with a proxy cache clustering technique.

29 Claims, 5 Drawing Sheets

PROXY CACHE CLUSTER

CROSS-REFERENCE TO RELATED APPLICATION

This invention is related to the following copending and commonly assigned U.S. patent application Ser. No. 09/023,895 titled, Client Inherited Functionality Derived from a Proxy Topology where each Proxy is Independently Configured by Douglas G. Earl et al, filed on Feb. 13, 1998.

FIELD OF THE INVENTION

The present invention relates to services of communications networks and, more specifically, to a system and method for increasing the availability of services offered by a service provider of a communications network.

BACKGROUND OF THE INVENTION

It is increasingly common for users having standalone computers, or computers interconnected by an institutional intranet or local area network, to gain access to various remote sites (such as those on the "World Wide Web") via the well-known Internet communications network. Using resident web browser applications executing on the computers, these clients may navigate among services ("pages") stored on various servers of a service provider ("web site") and may further request these services as desired. In a basic network communication arrangement, clients are free to access any remote web site for which uniform resource locators (URLs) are available.

It is also increasingly common in network applications to provide the web site servers with associated proxy cache servers that link ("front-end") the servers with the Internet. A proxy cache server ("proxy") may be used to accelerate client access to the Internet ("forward proxy") or to accelerate Internet access to a web server ("reverse proxy"). As for the latter reverse proxy environment, the proxy may access frequently requested services from the web servers and store ("host") them locally to effectively speed-up access to future requests for the services. For instance, a proxy may host frequently requested web pages of a web site. In response to a request from a browser executing on a client, the proxy attempts to fulfill that request from its local storage; if it cannot, the proxy forwards the request to a web site server that can satisfy the request. The web server then responds by transferring a stream of information to the proxy, which stores and forwards the information over the Internet onto the client. The illustrative embodiment of the invention described herein is applicable to a reverse proxy environment.

As Internet traffic to the web site increases, the network infrastructure of the service provider may become strained attempting to keep up with the increased traffic. In order to satisfy such demand, the service provider may increase the number of network addresses for a particular service by providing additional web servers and/or associated proxies. These network addresses are typically Tranmission Control Protocol/Internet Protocol (TCP/IP) addresses that are represented by URLs or wordtext (domain) names and that are published in a directory service, such as the well-known Domain Name System (DNS). Computers referred to as name servers implement DNS by mapping between the domain names and TCP/IP address(es).

Since the proxies "front-end" the web servers (and may, in fact, be resident on the web servers) in a reverse proxy environment, the network addresses of the proxies (rather than the actual web site) are generally mapped to the domain name of the service provider. As a result, communication exchanges with the proxies generally comprise IP packets or UDP/TCP-socketed traffic, such as socket requests and responses. A socket is essentially an interface between an application layer and transport layer of a protocol stack that enables the transport layer to identify which application it must communicate with in the application layer. For example, a socket interfaces to a TCP/IP protocol stack via a set of application programming interfaces (API) consisting of a plurality of entry points into that stack. Applications that require TCP/IP connectivity typically utilize the socket API to interface into the TCP/IP stack.

For a connection-oriented protocol such as TCP, the socket may be considered a session; however, for a connectionless protocol such as IP datagram using the User Datagram Protocol (UDP), the socket is an entity/handle that the networking software (protocol stack) uses to uniquely identify an application layer end point, typically through the use of port numbers. The software entity within the server that manages the communication exchanges is a TCP/IP process, which is schematically illustrated as layers of a typical Internet communications protocol stack. Protocol stacks and the TCP/IP reference model are well-known and are, for example, described in *Computer Networks* by Andrew S. Tanenbaum, printed by Prentice Hall PTR, Upper Saddle River, N.J., 1996.

Thus to access a particular service, a client issues a request to the domain name of the service. A name server receives the request, looks up the domain name and returns all of the mapped (proxy) associated network addresses to the client. The client chooses a first of the addresses directed to a first proxy and sends a service request to that proxy. If the proxy has failed and is "down", the request is ignored; after waiting a period of time, the client may issue another request to that proxy. After sending one or more non-responsive requests to that address, the client may issue a request directed to a second address of a second proxy associated with the service. This time the request may be received and serviced by the second proxy.

Subsequent requests to the particular service may be satisfied as the client selects each of the remaining addresses in, e.g., a round-robin manner, until it comes back to the first address, where a request may again be directed to the first proxy. As long as this proxy is down, though, requests directed to that first network address are ignored. In addition to frustrating the client, such non-responsive requests may prove costly to the service provider in terms of lost revenue and service down-time. As for the latter, adding a new service or expanding an old service of, e.g., a web server may be time consuming and fraught with configuration challenges that typically result in lengthly installations. The present invention is directed to alleviating such time consuming activities and, more specifically, to efficiently increasing the availability of services offered by a service provider.

SUMMARY OF THE INVENTION

The present invention relates to a proxy cache cluster (PCC) coupled to a service provider of a communications network to increase the availability of services offered by the provider to clients connected to the network. As noted, the clients access the services by issuing requests to network addresses associated with these services. The PCC increases the availability of the services by receiving and servicing those requests on behalf of the service provider in accordance with a novel proxy cache clustering technique described herein.

Specifically, the PCC comprises a group of processor/memory mechanisms (PMMs) that cooperatively interact as a system to host services associated with the network addresses. By functioning as a system of proxy cache servers defined by a common configuration of PMMs, hosted PCC services and static PCC configuration parameters, the PCC improves availability, performance and scalability of the service provider, which preferably comprises a plurality of web servers. Scalability of the service provider may is be further achieved by adding PMMs, PCC service addresses and/or PMM network addresses to the PCC.

Operationally, a designated PMM of the PCC functions as a coordinator to administer the common configuration by, in part, implementing a load balancing aspect of the clustering technique to substantially optimize assignment of the network addresses to active PMM members. Load balancing is preferably implemented using characteristics of each PMM and PCC service, such as PMM capacity, PCC service load and PCC service address(es). Once the PCC is "balanced", each PMM attends to client requests directed to its assigned address(es). In the event of a failure to one of their members, the active PMMs collaborate with the PCC coordinator to reassign the failed PMM's service addresses among the remaining active members.

Advantageously, the invention facilitates the addition and/or expansion of services offered by a service provider by dynamically balancing service loads among the existing PMM members of the PCC. That is, the proxy cache clustering technique enables load balancing of the services using the service addresses assigned to the PMM members rather than employing additional web servers, as in the prior art. Moreover, the inventive clustering technique further increases the availability of those services by providing dynamic fault detection/failover recovery in the event of failure to the PMMs.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
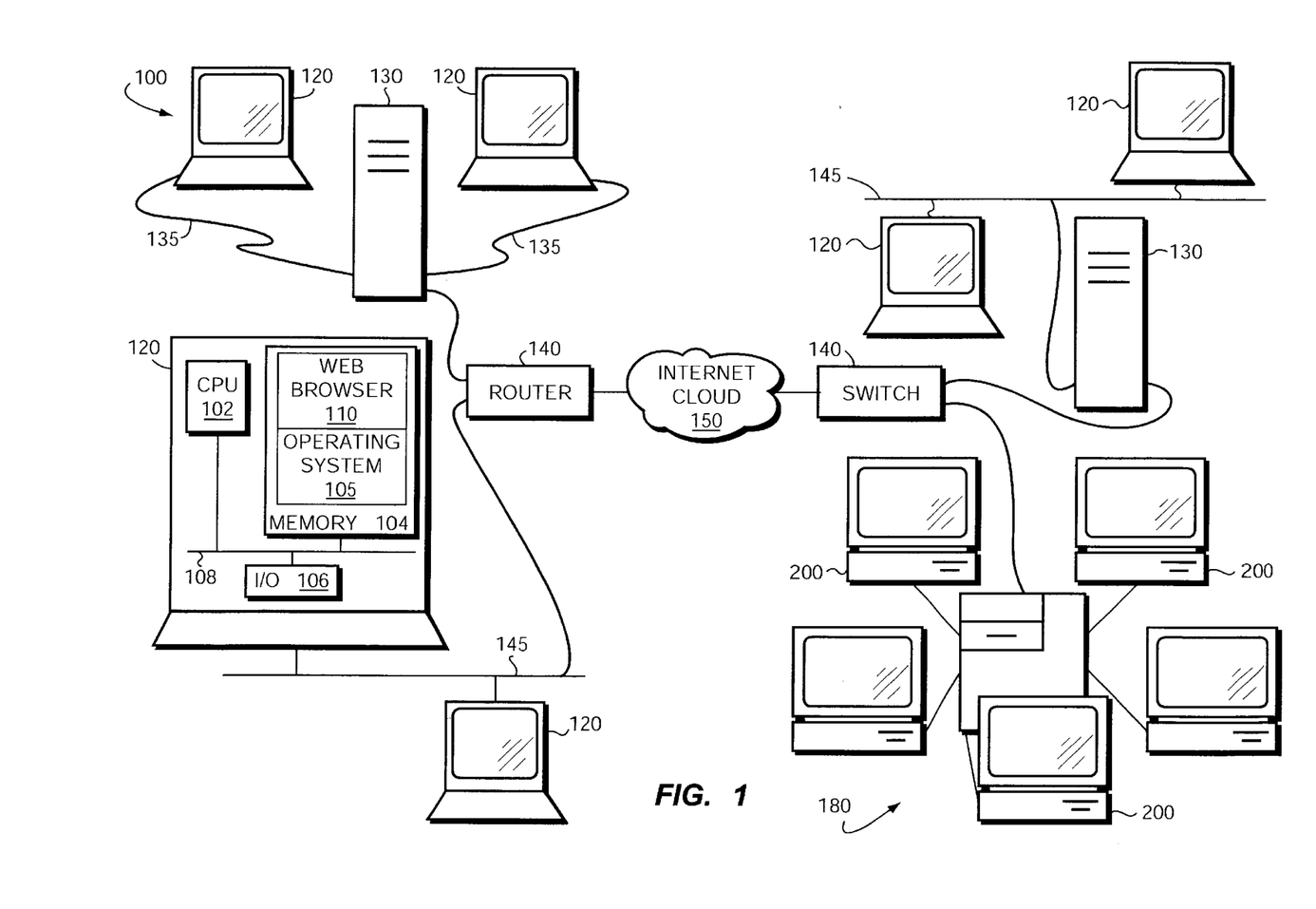
FIG. 1 is a block diagram of a computer internetwork including a collection of network segments connected to a plurality of client and server computers, the latter of which may be organized as a service provider.

FIG. 1 is a schematic block diagram of a computer internetwork 100 comprising a collection of network seg-ments connected to a plurality of computers 120, 130, 140 and 200. Each computer generally comprises a central processing unit (CPU) 102, a memory 104 and an input/output (I/O) unit 106 interconnected by a system bus 108. The memory 104 may comprise storage locations typically composed of random access memory (RAM) devices, which are addressable by the CPU 102 and I/O unit 106. An operating system 105, portions of which are typically resident in memory and executed by CPU, functionally organizes the computer by, inter alia, invoking network operations in support of application programs executing on the CPU. An example of such an application program is a web browser 110, such as Netscape Navigator™ available from Netscape Communications, Inc.

The network segments may comprise local area networks 145 or intranets, point-to-point links 135 and an Internet cloud 150. Collectively, the segments are interconnected by intermediate stations 140, such as a network switch or router, and configured to form an internetwork of computers that communicate by exchanging data packets according to a predefined set of protocols, such as the Transmission Control Protocol/Internet Protocol (TCP/IP). It should be noted that other techniques/protocols, such as Internet Packet Exchange (IPX) protocol and the Hypertext Transfer Protocol (HTTP), may be advantageously used with the present invention.

In the illustrative embodiment, the internetwork 100 is organized in accordance with a client/server architecture wherein computers 120 are personal computers or workstations configured as clients for interaction with users and computers 130, 200 are configured as servers that perform services as directed by the clients. For example, the servers 200 may be configured to operate as a service provider (e.g., a web site 180) as described further herein, whereas servers 130 may be configured as domain name system (DNS) servers and/or Internet provider servers. In general, the DNS servers provide the clients 120 with the network (e.g., IP) address(es) of requested services in response to packets directed to the domain names for those services. The Internet providers, on the other hand, provide Internet access to the clients via, e.g., dial-up telephone lines or cable links.

Figure 2:
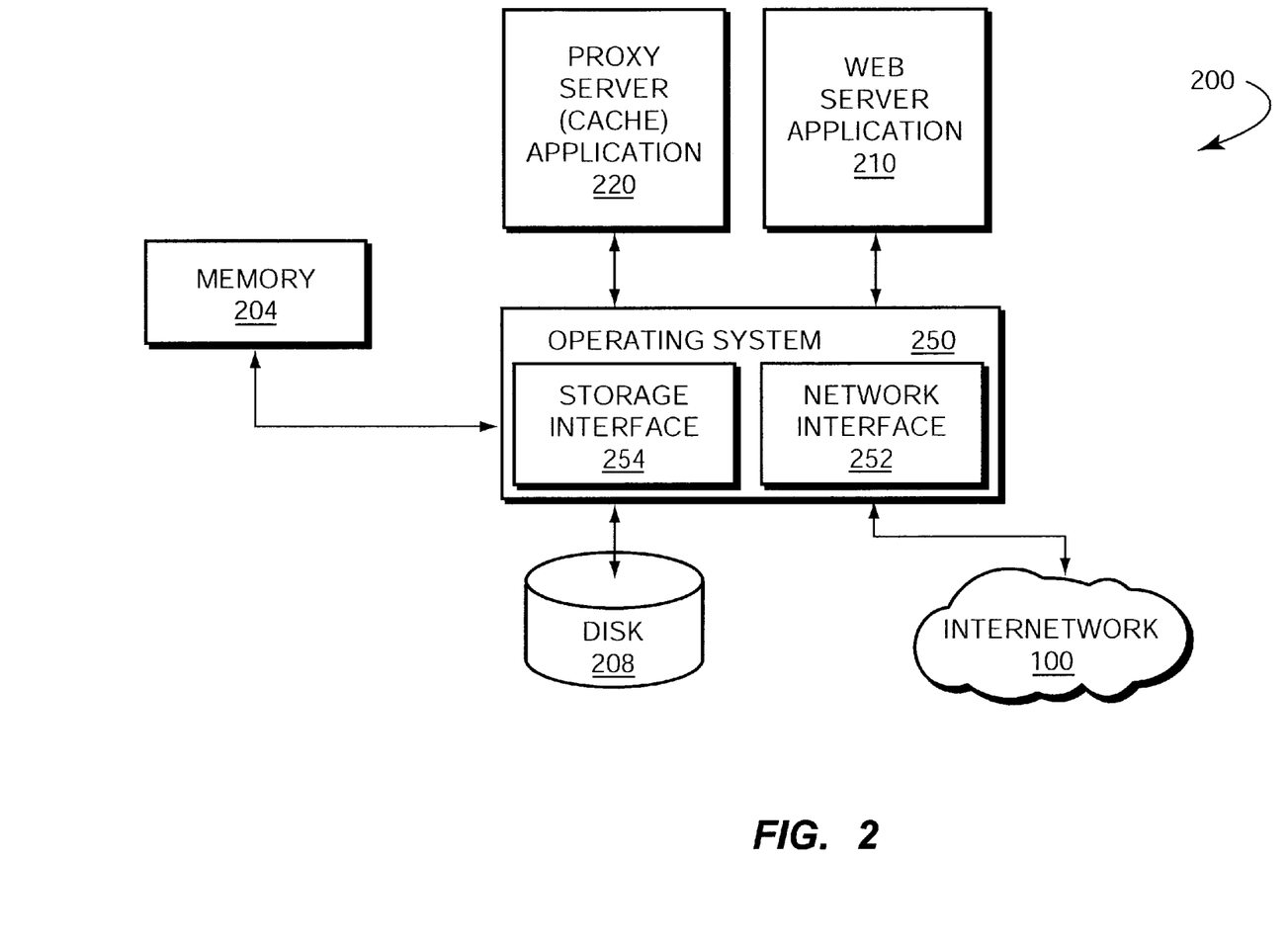
FIG. 2 is a highly schematized diagram of software components of the service provider server of FIG. 1.

The client 120 may utilize the web browser 110 to gain access to the web site 180 and to navigate, view or retrieve services stored on the servers 200, hereinafter "web" servers. In order to effectively speed-up access to the service provider and reduce the retrieval time for stored services, each web server 200 may be further provided with a proxy cache server. FIG. 2 is a highly schematized diagram of software components of the web server 200 including an operating system 250 having utility programs that interact with various application program components to provide, e.g., a storage interface 254 and a network interface 252, the latter enabling communication with a client browser 110 over the internetwork 100. The application program components include a web server application 210 and a proxy server application ("proxy") 220.

As noted, the proxy 220 "front-ends" the web server such that the network address of the proxy (rather than the actual web site) is published in the DNS server 130 and mapped to the domain name of the service provider. To access a service of the service provider 180, the client sends a request packet directed to the network address of a particular proxy 220 of the web site. The proxy 220 receives the request from the browser 110 and, if the client is authorized to access services from the web site, the proxy attempts to fulfill that request locally from information stored, e.g., in memory 204 or on disk 208; in either case, the memory and/or disk function as a "cache" for quickly storing and retrieving the services. If it cannot satisfy the request, the proxy forwards the request onto its web server application 210. The web server application then responds by transferring a stream of information to the proxy, which stores and forwards the information onto the browser 110. Although the proxy 220 is shown as resident on the web server 200, it should be noted that the proxy may also be configured to run on a separate server platform.

A problem arises with the arrangement described above when the particular proxy 220 is "down" because, e.g., of a failure with the server. After repeated attempts to access the proxy are ignored, the client may send a service request directed to a network address of another proxy (and another web server 200) of the web site 180; although this request may be serviced by the latter proxy and/or web server application 210, the previous non-responsive requests may prove costly to the service provider in terms of lost revenue, service down-time and user frustration. The present invention is directed, in part, to solving this problem. Moreover, adding a new service or expanding an old service of the web site may be accompanied by configuration issues that result in time consuming installations. The present invention is further directed to alleviating such time consuming activities.

Figure 3:
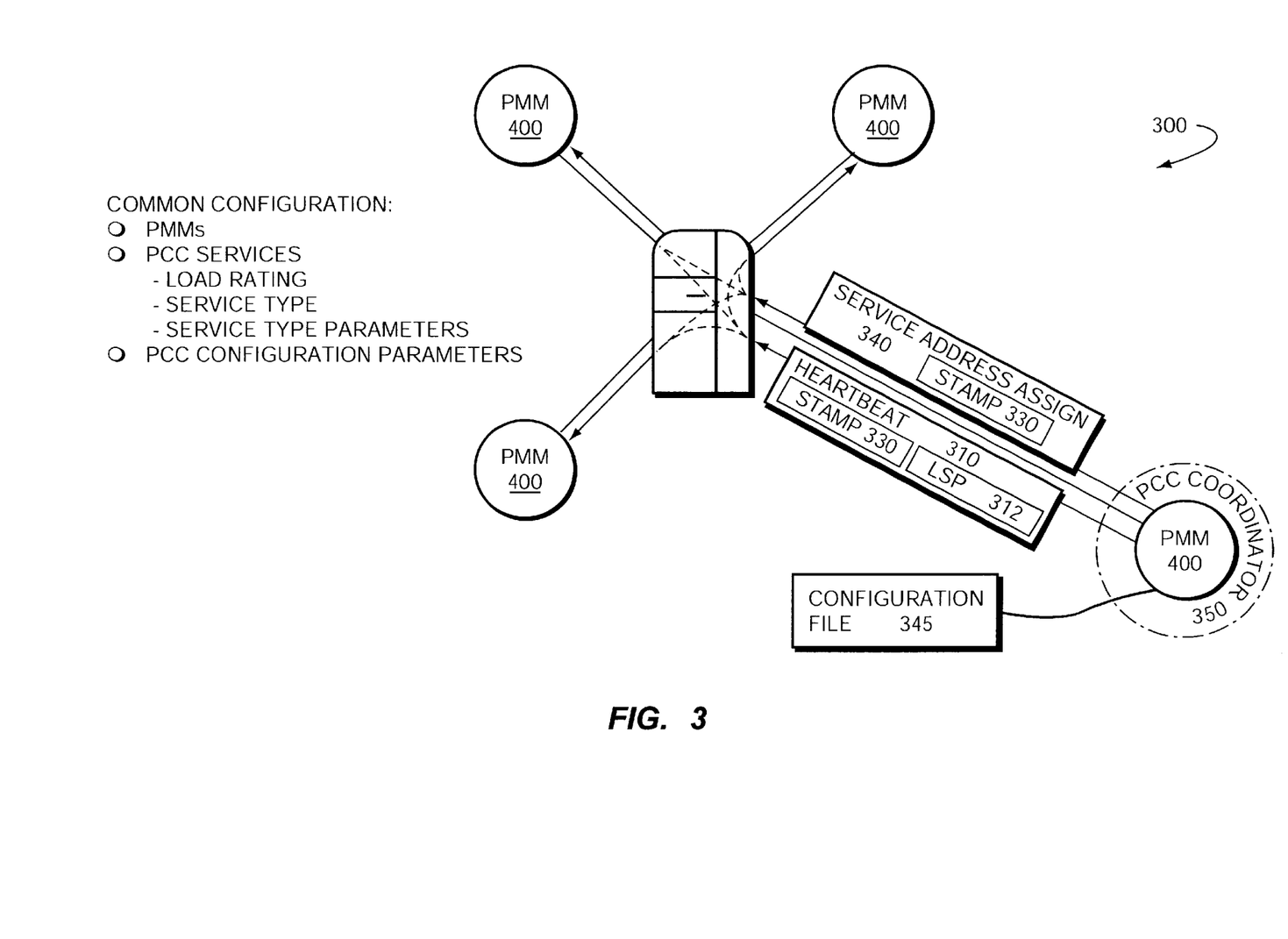
FIG. 3 is a schematic block diagram of an inventive proxy cache cluster (PCC) comprising a group of processor/memory mechanisms (PMMs) that cooperatively interact to host PCC services associated with network addresses of the service provider.

In accordance with the present invention, a proxy cache cluster (PCC) "front-ends" the servers of a service provider to increase the availability of services offered by the provider. As noted, the clients access the services by issuing requests to network addresses associated with the services. The PCC increases the availability of the services by receiving and servicing those requests on behalf of the service provider in accordance with a novel proxy cache clustering technique described herein. FIG. 3 is a schematic block diagram of a PCC 300 comprising a cluster of processor/memory mechanisms (PMMs 400) with associated network connectivity that share a common configuration. The PMMs cooperately interact as a system to host PCC services associated with network addresses of the service provider 180. In fact, the common configuration describes the PCC in terms of the PMMs, static PCC configuration parameters and hosted PCC services, which may include any service that is provided on the World Wide Web; an example of a common web site service is an HTTP service.

According to an aspect of the invention, a PCC service is characterized by (i) a load rating, which is a number/value that reflects a measure of the PCC service's resource source consumption, such as the amount of traffic at the web site 180. Notably, the actual value is not specified; just a consistent value to measure the resource consumption metric. Furthermore, the value is a relative value; i.e., relative to load rating of the other services hosted by the PCC. Measurement of this metric can be performed manually or via a software agent that dynamically (event-driven or continuous) assesses the load rating. The agent may comprise conventional instrumentation software, such as a simple network management protocol (SNMP) agent, or any other application that instruments the service to calculate its rating. Calculations are performed using normalized units of measurement to provide flexibility in the ratings and to facilitate dynamic ("on-the-fly") computer-generated measurements, particularly in the event of inclusion of additional PMMs to a cluster in accordance with the novel clustering technique. The agent further maintains (updates) these generated statistics for use when balancing the hosted services across the PCC.

The PCC service is further characterized by (ii) service type, such as an HTTP proxy service, an HTTP accelerator service or a file transfer protocol (FTP) proxy service; further examples of service types include Real Audio, Real Video, NNTP and DNS; and (iii) service type parameters that are unique to each service. Typical examples of conventional parameters run by an HTTP proxy service include (a) a list of network addresses of, e.g., the web site that allows access to the web servers, (b) whether logging is activated, (c) the format of the activated log (common or extended) and (d) the log roll rate. Most web sites that provide an HTTP service run logging operations to determine the type of requests issued by users, the kinds of errors received by those users and the source network addresses of the requests. This latter log provides an indication of geography with respect to, e.g., the locations of the highest concentration of users.

The PMMs are organized as a PCC in accordance with the proxy cache clustering technique that dynamically assigns each PMM to the PCC. To that end, each PMM is configured with a unique identifier (ID), a network address and PCC configuration software to enable participation in the clustering process. The unique ID may be the media access control (MAC) address of a network interface card of the PMM or it may be the network address of the PMM. Once configured and activated, the PMM "listens" for a mechanism notifying the PMM that it is a member of a PCC 300. According to the clustering technique, the notification mechanism is a heartbeat message 310 that is broadcasted to each member of the PCC. In the illustrative embodiment, the heartbeat message 310 is effectively an "I'm (still) alive" message that informs the cluster members that the sender is a member of the cluster and (still) available. The heartbeat message may include a conventional link state packet (LSP) mechanism 312 that allows dynamic cluster management. As the PMM receives heartbeat messages and "learns" about other PMMs, it sends its own heartbeat message 310 to those learned PMMs.

A designated PMM of the PCC functions as a PCC coordinator 350 to administer the common configuration and, as such, is responsible for assigning PCC service address(es) to each PMM. These service address assignments are contained in a message 340 that is periodically distributed to the PMMs 400 by the coordinator; each PMM is thus aware of all its peer PMMs in the cluster. The service address assignments 340 are derived from information contained in a configuration file 345. Each message transmitted by a member of the PCC, including the heartbeat 310 and service address assignments 340, is identified by a PCC Identifier or stamp 330. The stamp 330 is unique to the PCC and PCC configuration, and may be manifested as information appended to the body of a packet, or contained within an extended header or footer of the packet. All messages issued by the PCC coordinator are also marked with the stamp 330 so that the recipient PMMs can be assured ("trust") that the received messages are from their coordinator. In an alternate embodiment, the stamp may be a digital signature when utilizing a public key cryptography system.

Figure 4:
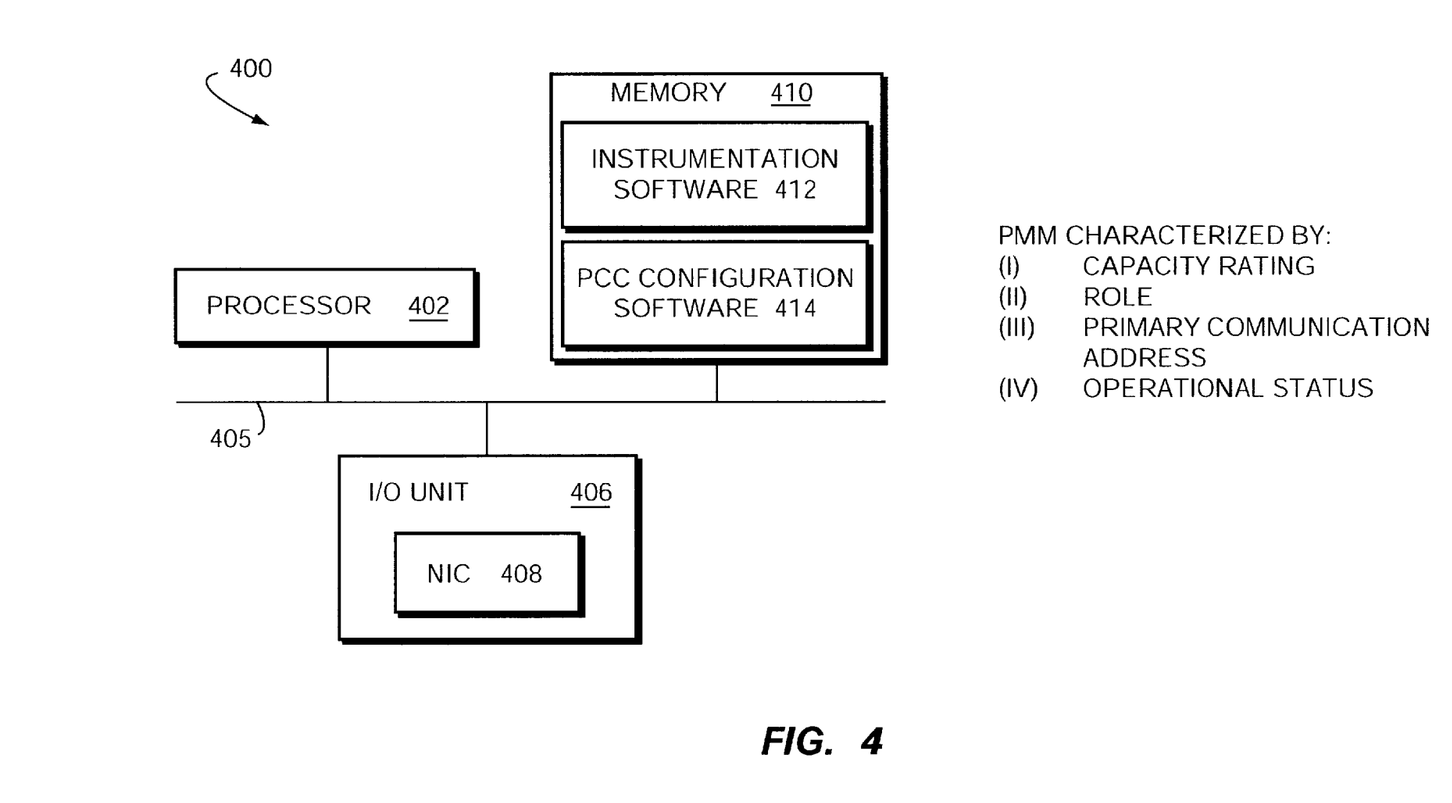
FIG. 4 is a schematic block diagram of a PMM of the present invention.

FIG. 4 is a schematic block diagram of a PMM 400. In the illustrative embodiment, the PMM is a personal computer or workstation configured as a server according to a single processor, single memory (SPSM) model, although in an alternate embodiment, the PMM may comprise a multi-processor server with or without multi-memory. In any event, the PMM contains processing (processor 402), memory 410 and input/output (I/O 406) resources having characteristics that differ relative to other PMMs of the PCC, but that cooperate to provide the inventive proxy cache clustering functions.

According to the invention, a PMM is characterized by (i) capacity rating, which is number/value that reflects a measure of the PMM's ability to provide resources. As with the service loading rating, the value is relative to the capacity rating of the other PMMs in the PCC 300 and measurement of this metric can be done manually or via conventional instrumentation software 412 (e.g., SNMP agents). Factors influencing the capacity rating of a PMM 400 include the "size" of its network connection, the "amount" of memory and the "speed" of its processor. For example, a PMM may have faster I/O capability than other PMMs due to its high-performance network interface card (NIC 408) "pipeline" (e.g., 100 base T or Sonet) to heterogeneous network segment media (e.g., 10 Mb, 100 Mb and/or Gigabit Ethernet or FDDI). Another PMM may provide faster processing capabilites than other PMMs because it contains a high-performance processor 402. The relative resource characteristics of the PMMs are taken into account by the inventive clustering technique to produce, inter alia, the capacity rating.

The PMM may also be characterized by (ii) role. The PMM role describes various activity states of the PMM as manifested in the configuration file 340 and/or by the heartbeat 310. For example, an active role allows the PMM to participate in all PCC activities, whereas a standby role prohibits assignments to the PMM until at least one other PMM is down or unusable. It should be noted that a PMM may be a member of more than one PCC; e.g., there may be 2 PMMs on a low-usage service cluster and 4 PMMs on another high-usage service cluster. A PMM of the low-usage cluster may be configured into the high-usage cluster as a standby which means the PMM will continue operating as a member of the low-usage cluster until a failure occurs in the high-usage cluster. At that time, the PMM will assume additional responsibilities for that latter cluster. The capacity rating of the standby PMM determines whether the machine may be utilized in such a role, which effectively sacrifices performance of the slower, low-usage service to ensure performance of the higher-usage service.

In the case of the standby role, the PMM 400 transmits a heartbeat message 310 to inform the high-usage PCC coordinator of its availability in the event of a problem. The configuration file 340 specifies the roles of the member PMMs and their network addresses. Thus if a failure occurs, the PCC coordinator 350 sends a message to the standby PMM notifying it that it is no longer on standby, that it is an active member of the high-usage cluster and as to its address assignment(s). The configuration file is updated to reflect this changed role status and is distributed to all PMM members of the PCC. If the errant PMM comes back online, the PCC coordinator 350 transitions the PMM 400 back to the standby mode and rebalances the cluster with the errant PMM. The standby PMM finishes its current and pending work, and reverts to standby mode. It should be noted that multiple PMMs may assume the standby role for a PCC and that a PMM may be a member of multiple clusters. Moreover, a PMM may assume standby status on some clusters and active status on others. A PMM that assumes such a dual role distinguishes its responsibilities and communication exchanges among the various PCCs by way of the PCC stamp 330.

An unusable role indicates that the PMM cannot be used at all by the PCC, while the down role is automatically assigned by the PCC coordinator upon failure to detect a heartbeat within the prescribed period. In particular, the unusable role state is used when reconfiguring or reloading a PMM with, e.g., new software (upgrade the clustering software or protocol stack). The PCC coordinator 350 marks the PMM unusable and rebalances the cluster. During this rebalancing period, the PMM 400 finishes its work on requests pending in an incoming queue and then shuts itself down (from the point of view of being a cluster member). Once the PMM is reloaded, it transitions into the active state and, upon other members detecting its presence, the PMM rejoins the cluster by receiving assignments from the PCC coordinator.

Note that an "administrative fault" can be created by changing any PMM's role status to unusable. For example, assume a 3-PMM cluster is moved from one location to another facility. Prior to moving the PCC, a first PMM is placed in the unusable state and proceeds to empty its incoming queue with pending requests, power down, move to the new facility, and power up. According to the inventive clustering technique, the PCC coordinator immediately performs the tasks of a fault-failover, configuring the PMM out of the PCC until it is relocated and brought online. At that point, the PMM is placed in the active state to rejoin the cluster. The same procedure takes place for a second PMM. However when the last PMM, which is the PCC coordinator, is placed in the unusable role and powered down, the remaining two PMMs elect a new coordinator and the relocating procedure described above takes place. The PMM conveys its role status to the cluster members through the heartbeat message 310; e.g., presence of a heartbeat=active or standby roles, whereas absence of a heartbeat=unusable or down roles.

The PMM 400 may be further characterized by (iii) primary communication address and (iv) operational status. The primary communication address is the network address on which PCC-specific communication among PMMs and PCC coordinator occurs; this address may be used as the unique ID of the PMM. The primary network address is also the identifier that is preferably used to elect a PCC coordinator, e.g., the PMM with lowest IP address. It will be understood to those skilled in the art, however, that other techniques could be used to elect a coordinator, such as use of a MAC address or anything that allows unique identification of the PMM machine.

The operational status of a PMM includes joining, up, down and leaving states. A PMM assumes a joining status when attempting to rejoin its cluster after being offline. Once the PCC coordinator accepts the PMM and rebalances the cluster, the PMM assumes an up status. When the PMM is removed from the cluster, it enters a leaving status to gracefully bring itself to a down status.

Table 1 illustrates an exemplary PCC configuration file 345 containing a list of PMMs (Servers 1–3) by network (IP) address and a list of PCC services (Services 1–2 ). The configuration file also contains a list of static PCC configuration parameters and specific numbers/values associated with each parameter.

TABLE 1

PCC configuration file

[Main]
name=TestCluster
heartBeatTimerTicks=20
alertTimerTicks=10
joinTimeoutTicks=100
failureSuspectedTimeTicks=50
failureConfirmedTimeTicks=100
countServers=3
countServices=2
[Service 1]      ; Forward Proxy
serviceType=1    ; 1 = HTTP Proxy, 2 = HTTP Accel
serviceName=TestCluster.Proxy.Com
serviceNameAndAddressList=137.65.24.210,137.65.24.211
port=8080

TABLE 1-continued

PCC configuration file

```
loadWeight=1
webServerPort=0    ; for accelerators only
webServerNameAndAddressList=    ; for accelerators only
commonLogEnabled=1       ; 0 = no, 1 = yes
extendedLogEnabled=1    ; 0 = no, 1 = yes
indexedLogEnabled=0     ; 0 = no, 1 = yes
[Service 2]       ; Web Server Accelerator of www.test.com
serviceType=2     ; 1 = HTTP proxy, 2 = HTTP accel
port=80
loadWeight=1
serviceName=www.test.com
serviceNameAndAddressList=137.65.24.220,137.65.24.221
webServerPort=80
webServerNameAndAddressList=www.test.com
commonLogEnabled=0       ; 0 = no, 1 = yes
extendedLogEnabled=0    ; 0 = no, 1 = yes
indexedLogEnabled=0     ; 0 = no, 1 = yes
[Server 1]
serverName=Calypso
primaryIPAddress=137.65.24.98
role=1
capacityWeight=1
[Server 2]
serverName=Sapphire
primaryIPAddress=137.65.24.114
role=1
capacityWeight=1
[Server 3]
serverName=Melout
primaryIPAddress=137.65.24.81
role=2
capacityWeight=1
```

As listed in Table 1, the static configuration parameters include (1) failure suspected threshold, (2) failure confirmed threshold, (3) join timeout interval, (4) heartbeat timer interval and (5) alert timer interval. These parameters, which are described below, provide the basis of a fault-failover aspect of the inventive clustering technique.

Failure suspected threshold. As noted, each PMM 400 constantly monitors the heartbeat 310 of other PMM members of the PCC 300. If a heartbeat message from a particular PMM is not detected by another PMM before this threshold is exceeded, then failure of the particular PMM is suspected. At this time, each PMM actively tries to reestablish communication with the suspected PMM. Note that the LSP portion 312 of the heartbeat message 310 enables each PMM to maintain state information about the other PMM members. For example, whenever a PMM detects a heartbeat of another PMM member (via a recent time stamped heartbeat message from that member), it sets a counter indicating such heartbeat detection. The PMM periodically scans these states and if a heartbeat is not detected within the prescribed period, i.e., the failure suspect threshold, then the PMM transitions to a more aggressive state to confirm the suspected failure. That is, the PMM tries to actively reestablish communication by sending messages to the suspect PMM inquiring as to its status.

Failure confirmed threshold. If attempts by PMM members to actively communicate with a suspect PMM do not succeed within this threshold, failure of the PMM is confirmed, the suspect PMM is effectively eliminated from the PCC and the PCC coordinator 350 begins redefining the loads of the remaining PCC members. Despite the reason for not responding, e.g., the PMM 400 is down, its connecting link is down or a port of the router into which the link is plugged is down, the suspect PMM is no longer capable of functioning as a member of the cluster and no longer has assignments from the PCC 300. Further, the PCC will not issue additional assignments to the suspect PMM until its members receive heartbeat messages from the suspect machine; at that time, the PCC coordinator reorganizes the cluster to include the now reappearing PMM.

If the suspect PMM is the current coordinator of the PCC, the cluster members proceed to determine the identity of a new PCC coordinator. A PMM may "volunteer" to be the coordinator and, if others agree, it is elected as such and the PCC is formed. Because the configuration file 340 is readily available to each PMM member, the election process may be quickly effected by examining the file's content and determining which remaining PMM meets the election criteria. In the illustrative embodiment, the PCC coordinator 350 is preferably the PMM 400 having the lowest IP address, whose role is active or standby, whose operational status is up or joining and who promiscuously declares, "I am the PCC coordinator". However, other election mechanisms are contemplated by the present invention. For example in another embodiment, the election criteria may take into account the capacity of each PMM or a special connectivity mechanism to a monitoring system.

Join timeout interval. This interval defines a period of time within which a PCC waits for a PMM to join, which may happen either at PCC creation, PCC merge or any PCC reconfiguration resulting from a PMM being down. An interesting situation involving this interval arises when the PMM attempting to "join" the PCC is a nominee to become the PCC coordinator. For example, assume the PMM that would "naturally" be elected PCC coordinator, i.e., the PMM with the lowest IP address, cannot consistently communicate with the other PCC members. Although it sent a message to the members inviting them to "join-up", the PMM thereafter does not contact the members within this time period. When the join timeout interval expires, the remaining members transition to a selection phase to elect another PMM as the PCC Coordinator. This prevents the cluster from "hanging" in a waiting mode for an extended period of time.

Heartbeat timer interval. This is the frequency of the transmitted PCC heartbeat messages 310 which may occur, for example, every 50 milliseconds (msecs). If a heartbeat is not detected from any PMM 400 within this interval, the remaining PMMs transition to the failure suspect threshold state and proceed as described above.

Alert timer interval. This is the frequency of a PCC alert timer which is generally greater than the regular heartbeat timer. When a PCC configuration change is pending, a PMM attempts to resolve the pending transaction by delivering cluster messages using the alert timer. PMMs transition into an alert mode when attempting to form a PCC; in this mode, they exchange messages at a faster frequency than the heartbeat in order to synchronize the members as the cluster forms.

According to another aspect of the invention, the PCC coordinator 350 further administers the common configuration by implementing a load balancing aspect of the clustering technique. Load balancing substantially optimizes the assignment of network addresses to active PMM members and is preferably implemented using the relative characteristics of each PMM and PCC service, such as PMM capacity, PCC service load and PCC service address(es). Once the PCC is "balanced", each PMM attends to client requests directed to its assigned addresses. In the event of a failure to one of their members, the active PMMs collaborate with the PCC coordinator to reassign the failed PMM's network addresses among the remaining active members.

Figure 5:
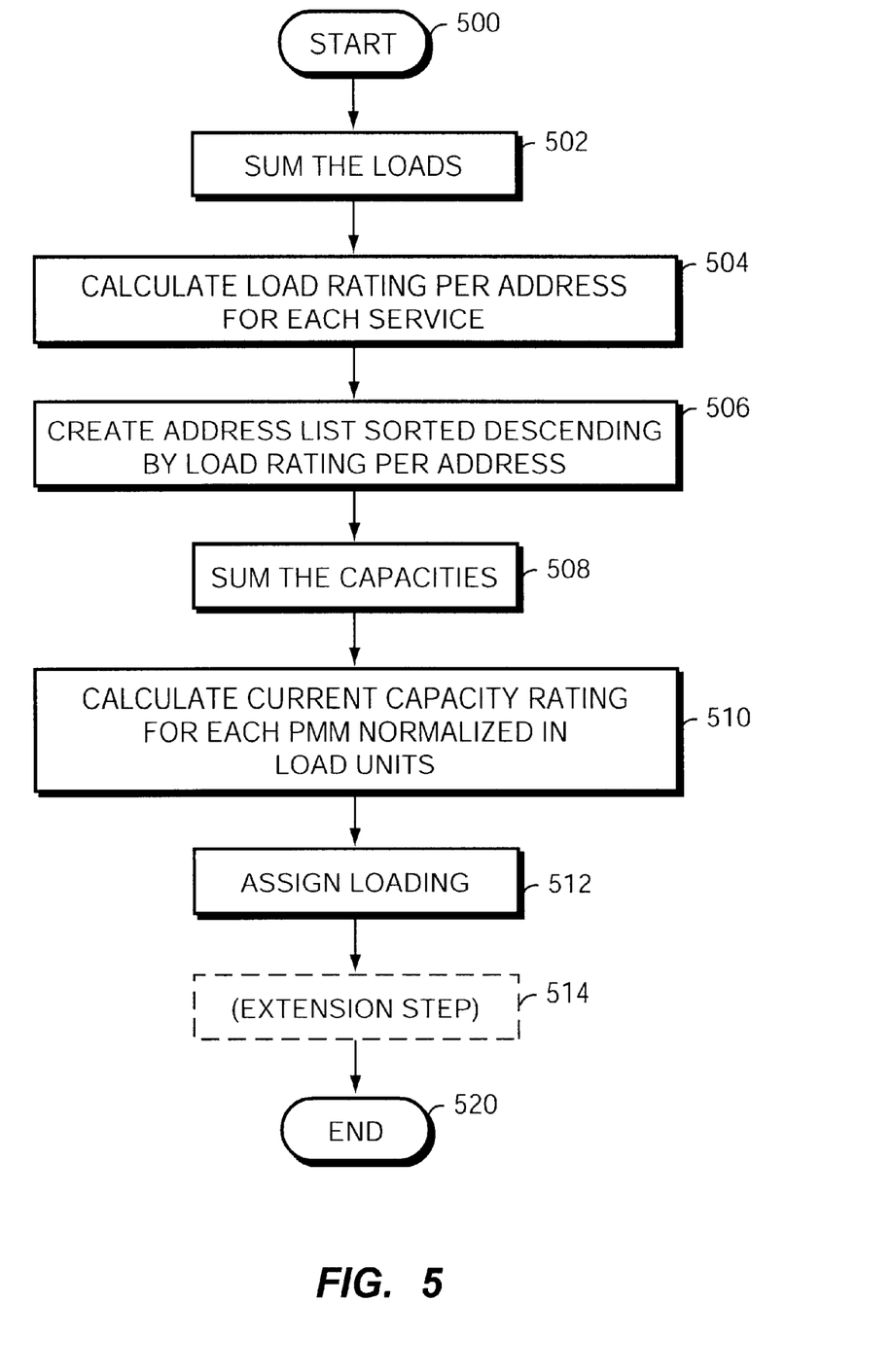
FIG. 5 is a flowchart depicting a sequence of steps associated with a load balancing technique according to the present invention.

The following Examples 1–4 illustrate the inventive load balancing technique which is preferably implemented by the PCC coordinator in accordance with a sequence of steps depicted in the flowchart of FIG. 5. Specifically, the PCC coordinator executes a novel algorithm represented by the examples and flowchart to calculate these loads for the PCC members. In the example, the PCC comprises three (3) PMMs and four (4) PCC services hosted by the PMMs. The capacity rating of the first PMM is Cap10, the capacity rating of the second PMM is Cap15 and the capacity rating of third PMM is Cap6, whereas the load rating of each service is L10, L2, L20 and L10, respectively. In addition, there are a number of service addresses (A3, A1, A5 and A2) associated with each PCC service. For example, PCC Service1 has a load rating L10 and also has 3 service addresses (A3) associated with its service; e.g., 1.1.1.1, 1.1.1.2 and 1.1.1.3.

EXAMPLE 1

Assume the following PMMs and capacities:

| PMM1 | Cap10 |
|------|-------|
| PMM2 | Cap15 |
| PMM3 | Cap6  |

Assume the following Services with associated load ratings and addresses

| Service1 | L10 | A3 (1.1.1.1, 1.1.1.2, 1.1.1.3) |
| Service2 | L2  | A1 (1.1.1.4) |
| Service3 | L20 | A5 (1.1.1.5, 1.1.1.6, 1.1.1.7, 1.1.1.8, 1.1.1.9) |
| Service4 | L10 | A2 (1.1.1.10, 1.1.1.11) |

Referring to the flowchart of FIG. 5, the load balancing sequence starts at Step 500 and proceeds to Step 502 where the loading ratings are summed.

Sum the Service loads: 10+2+20+10=42

In Step 504, the loading rating per address for each service is calculated. For example, the Service1 has three addresses A3, so the load rating L of 10 is divided by 3 to get 3.3.

Calculate a load rating for each address for each service:
10/3=3.3, 2/1=2, 20/5=4, 10/2=5

In Step 506, an address list is created with the list being sorted, in descending order, by the load rating per address. For example, Service4 has two addresses A2 and a load rating of L10. The service load rating for each address of Service4 is 5. Thus, e.g., IP service address 1.1.1.10 is assigned a load rating per address of 5 and service address 1.1.1.11 is also assigned a load rating per address of 5. Note that an address is associated with each entry of the list.

Create an address list sorted descending by load rating per address
Service4, Load Rating 5, Service address 1.1.1.10
Service4, Load Rating 5, Service address 1.1.1.11
Service3, Load Rating 4, Service address 1.1.1.5
Service3, Load Rating 4, Service address 1.1.1.6
Service3, Load Rating 4, Service address 1.1.1.7
Service3, Load Rating 4, Service address 1.1.1.8
Service3, Load Rating 4, Service address 1.1.1.9
Service1, Load Rating 3.3, Service address 1.1.1.1
Service1, Load Rating 3.3, Service address 1.1.1.2
Service1, Load Rating 3.3, Service address 1.1.1.3
Service2, Load Rating 2, Service address 1.1.1.4

Step 506 thus calculates an anticipated load for each service address for purposes of optimally or near-optimally balancing the actual load across the entire cluster. In Step 508, the capacity ratings of the PMMs are summed.

Sum the PMM capacities: 10+15+6=31

In Step 510, the current capacity rating for each PMM is calculated and normalized to a common load unit metric (CapacityRating×TotalLoad)/TotalCapacity Calculate the current capacity rating for each PMM normalized in Load Units: (CapacityRating*TotalLoad)/TotalCapacity
PMM1=13.5
PMM2=20.32
PMM3=8.13

In Step 512, the load ratings per address are assigned by (i) getting the first load rating by address, (ii) assigning this service address to PMM with highest current capacity rating, (iii) reducing the current capacity rating of the PMM by the load rating assigned; (iv) removing the first load rating by address from the list; and (v) repeating Step 512 until done.

Assign loading
   get the first load rating by address=Service4, Load Rating 5, Service address 1.1.1.10
   assign this service address to the PMM with the highest current capacity rating
      PMM2=20.32
      PMM2 now is responsible for service address 1.1.1.10
   reduce the current capacity rating of the PMM by the load assigned
      PMM2=20.32–5=15.32
   The new PMM list becomes
      PMM1=13.5
      PMM2=15.32
      PMM3=8.13
   remove the first load rating by address from the list
      Service4, Load Rating 5, Service address 1.1.1.11
      Service3, Load Rating 4, Service address 1.1.1.5
      Service3, Load Rating 4, Service address 1.1.1.6
      Service3, Load Rating 4, Service address 1.1.1.7
      Service3, Load Rating 4, Service address 1.1.1.8
      Service3, Load Rating 4, Service address 1.1.1.9
      Service1, Load Rating 3.3, Service address 1.1.1.1
      Service1, Load Rating 3.3, Service address 1.1.1.2
      Service1, Load Rating 3.3, Service address 1.1.1.3
      Service2, Load Rating 2, Service address 1.1.1.4
   repeat
   get the first load rating by address=Service4, Load Rating 5, Service address 1.1.1.11
   assign this service address to the PMM with the highest current capacity rating
      PMM2=15.32
      PMM2 now is responsible for service address 1.1.1.11
   reduce the current capacity rating of the PMM by the load assigned
      PMM2=15.32–5=10.32
   The new PMM list becomes
      PMM1=13.5
      PMM2=10.32
      PMM3=8.13
   remove the first load rating by address from the list
      Service3, Load Rating 4, Service address 1.1.1.5
      Service3, Load Rating 4, Service address 1.1.1.6
      Service3, Load Rating 4, Service address 1.1.1.7
      Service3, Load Rating 4, Service address 1.1.1.8

Service3, Load Rating 4, Service address 1.1.1.9
Service1, Load Rating 3.3, Service address 1.1.1.1
Service1, Load Rating 3.3, Service address 1.1.1.2
Service1, Load Rating 3.3, Service address 1.1.1.3
Service2, Load Rating 2, Service address 1.1.1.4
repeat
get the first load rating by address=Service3, Load Rating 4, Service address 1.1.1.5
assign this service address to the PMM with the highest current capacity rating
PMM1=13.5
PMM1 now is responsible for service address 1.1.1.5
reduce the current capacity rating of the PMM by the load assigned
PMM1=13.5−4=9.5
The new PMM list becomes
    PMM1=9.5
    PMM2=10.32
    PMM3=8.13
remove the first load rating by address from the list
    Service3, Load Rating 4, Service address 1.1.1.6
    Service3, Load Rating 4, Service address 1.1.1.7
    Service3, Load Rating 4, Service address 1.1.1.8
    Service3, Load Rating 4, Service address 1.1.1.9
    Service1, Load Rating 3.3, Service address 1.1.1.1
    Service1, Load Rating 3.3, Service address 1.1.1.2
    Service1, Load Rating 3.3, Service address 1.1.1.3
    Service2, Load Rating 2, Service address 1.1.1.4
repeat
get the first load rating by address=Service3, Load Rating 4, Service address 1.1.1.6
assign this service address to the PMM with the highest current capacity rating
PMM2=10.32
PMM2 is now responsible for service address 1.1.1.6
reduce the current capacity rating of the PMM by the load assigned
PMM2=10.32−4=6.32
The new PMM list becomes
    PMM1=9.5
    PMM2=6.32
    PMM3=8.13
remove the first load rating by address from the list
    Service3, Load Rating 4, Service address 1.1.1.7
    Service3, Load Rating 4, Service address 1.1.1.8
    Service3, Load Rating 4, Service address 1.1.1.9
    Service1, Load Rating 3.3, Service address 1.1.1.1
    Service1, Load Rating 3.3, Service address 1.1.1.2
    Service1, Load Rating 3.3, Service address 1.1.1.3
    Service2, Load Rating 2, Service address 1.1.1.4
repeat
get the first load rating by address=Service3, Load Rating 4, Service address 1.1.1.7
assign this service address to the PMM with the highest current capacity rating
PMM1=9.5
PMM1 is now responsible for service address 1.1.1.7
reduce the current capacity rating of the PMM by the load assigned
PMM1=9.5−4=5.5
The new PMM list becomes
    PMM1=5.5
    PMM2=6.32
    PMM3=8.13
remove the first load rating by address from the list
    Service3, Load Rating 4, Service address 1.1.1.8
    Service3, Load Rating 4, Service address 1.1.1.9
    Service1, Load Rating 3.3, Service address 1.1.1.1
    Service1, Load Rating 3.3, Service address 1.1.1.2
    Service1, Load Rating 3.3, Service address 1.1.1.3
    Service2, Load Rating 2, Service address 1.1.1.4
repeat
get the first load rating by address=Service3, Load Rating 4, Service address 1.1.1.8
assign this service address to the PMM with the highest current capacity rating
PMM3=8.13
PMM3 is now responsible for service address 1.1.1.8
reduce the current capacity rating of the PMM by the load assigned
PMM3=8.13−4=4.13
The new PMM list becomes
    PMM1=5.5
    PMM2=6.32
    PMM3=4.13
remove the first load rating by address from the list
    Service3, Load Rating 4, Service address 1.1.1.9
    Service1, Load Rating 3.3, Service address 1.1.1.1
    Service1, Load Rating 3.3, Service address 1.1.1.2
    Service1, Load Rating 3.3, Service address 1.1.1.3
    Service2, Load Rating 2, Service address 1.1.1.4
repeat
get the first load rating by address=Service3, Load Rating 4, Service address 1.1.1.9
assign this service address to the PMM with the highest current capacity rating
PMM2=6.32
PMM2 is now responsible for service address 1.1.1.9
reduce the current capacity rating of the PMM by the load assigned
PMM2=6.32−4=2.32
The new PMM list becomes
    PMM1=5.5
    PMM2=2.32
    PMM3=4.13
remove the first load rating by address from the list
    Service1, Load Rating 3.3, Service address 1.1.1.1
    Service1, Load Rating 3.3, Service address 1.1.1.2
    Service1, Load Rating 3.3, Service address 1.1.1.3
    Service2, Load Rating 2, Service address 1.1.1.4
repeat
get the first load rating by address=Service1, Load Rating 3.3, Service address 1.1.1.1
assign this service address to the PMM with the highest current capacity rating
PMM1=5.5
PMM1 is now responsible for service address 1.1.1.1
reduce the current capacity rating of the PMM by the load assigned
PMM1=5.5−3.3=2.2
The new PMM list becomes
    PMM1=2.2
    PMM2=2.32
    PMM3=4.13
remove the first load rating by address from the list
    Service1, Load Rating 3.3, Service address 1.1.1.2
    Service1, Load Rating 3.3, Service address 1.1.1.3
    Service2, Load Rating 2, Service address 1.1.1.4
repeat
get the first load rating by address=Service1, Load Rating 3.3, Service address 1.1.1.2
assign this service address to the PMM with the highest current capacity rating
PMM3=4.13

PMM3 is now responsible for service address 1.1.1.2
reduce the current capacity rating of the PMM by the load assigned
PMM3=4.13−3.3=0.83
The new PMM list becomes
   PMM1=2.2
   PMM2=2.32
   PMM3=0.83
remove the first load rating by address from the list
   Service1, Load Rating 3.3, Service address 1.1.1.3
   Service2, Load Rating 2, Service address 1.1.1.4
repeat
get the first load rating by address=Service1, Load Rating 3.3, Service address 1.1.1.3
assign this service address to the PMM with the highest current capacity rating
   PMM2=2.32
PMM2 is now responsible for service address 1.1.1.3
reduce the current capacity rating of the PMM by the load assigned
   PMM2=2.32−3.3=−0.98 Note that negative numbers work without modification
   The new PMM list becomes
      PMM1=2.2
      PMM2=−0.98
      PMM3=0.83
remove the first load rating by address from the list
   Service2, Load Rating 2, Service address 1.1.1.4
repeat
get the first load rating by address=Service2, Load Rating 2, Service address 1.1.1.4
assign this service address to the PMM with the highest current capacity rating
   PMM1=2.2
PMM1 is now responsible for service address 1.1.1.4
reduce the current capacity rating of the PMM by the load assigned
   PMM1=2.2−2=0.2
   The new PMM list becomes
      PMM1=0.2
      PMM2=−0.98
      PMM3=0.83
remove the first load rating by address from the list exit
The resulting solution:
   PMM1 (1.1.1.5, 1.1.1.7, 1.1.1.1, 1.1.1.4)
   PMM2 (1.1.1.10, 1.1.1.11, 1.1.1.6, 1.1.1.9, 1.1.1.3)
   PMM3 (1.1.1.8, 1.1.1.2)

Upon completing Step 512 by exhausting the list created in Step 506, the sequence ends at Step 520 with an optimal or near optimal balance of loads across the cluster being achieved. The PCC coordinator 350 then makes the assignments by distributing the updated configuration file 340 to each member. As noted, the file 340 specifies the network service addresses that each PMM member will respond to and serve. The members store the file for future reference when servicing those addresses. For example, PMM3 receives the configuration file message indicating that it is assigned service addresses 1.1.1.8 and 1.1.1.2. Accordingly, the PMM 400 starts servicing those assigned addresses.

It should be noted that the inventive load balancing technique may be extended to allow for other considerations. For instance, the second pass through Step 512 results in addresses associated with the same service (Service4) being assigned to the same machine (PMM2). It may be desirable not to have two service addresses for the same service "clumped" to the same PMM. To avoid such clumping, the invention contemplates modification of the process to allow assignment of the second service address to the PMM with the next highest current capacity rating (e.g., PMM1 with the 13.5 current capacity rating). This modification, which is illustrated in Example 2 below, increases the availability of the PCC 300 so that in the event PMM2 fails, there will be at least one service address available for Service4 while the PCC reconfigures itself. It will be obvious to those skilled in the art that other modifications/loading balancing algorithms can be utilized to achieve the goals of improved availability, performance, fault failover, etc.

EXAMPLE 2

Assume the following PMMs and capacities:

| | |
|---|---|
| PMM1 | Cap10 |
| PMM2 | Cap15 |
| PMM3 | Cap6 |

Assume the following Services with associated load ratings and addresses

| | | |
|---|---|---|
| Service1 | L10 | A3 (1.1.1.1, 1.1.1.2, 1.1.1.3) |
| Service2 | L2  | A1 (1.1.1.4) |
| Service3 | L20 | A5 (1.1.1.5, 1.1.1.6, 1.1.1.7, 1.1.1.8, 1.1.1.9) |
| Service4 | L10 | A2 (1.1.1.10, 1.1.1.11) |

Sum the Service loads: 10+2+20+10=42
Calculate a load rating for each address for each service:
   10/3=3.3, 2/1=2, 20/5=4, 10/2=5
Create an address list sorted descending by load rating per address
   Service4, Load Rating 5, Service address 1.1.1.10
   Service4, Load Rating 5, Service address 1.1.1.11
   Service3, Load Rating 4, Service address 1.1.1.5
   Service3, Load Rating 4, Service address 1.1.1.6
   Service3, Load Rating 4, Service address 1.1.1.7
   Service3, Load Rating 4, Service address 1.1.1.8
   Service3, Load Rating 4, Service address 1.1.1.9
   Service1, Load Rating 3.3, Service address 1.1.1.1
   Service1, Load Rating 3.3, Service address 1.1.1.2
   Service1, Load Rating 3.3, Service address 1.1.1.3
   Service2, Load Rating 2, Service address 1.1.1.4
Sum the PMM capacities: 10+15+6=31
Calculate the current capacity rating for each PMM normalized in Load Units (CapacityRating*TotalLoad)/ TotalCapacity
   PMM1=13.5
   PMM2=20.32
   PMM3=8.13
Assign loading
   get the first load rating by address=Service4, Load Rating 5, Service address 1.1.1.10
   assign this service address to the PMM with the highest current capacity rating
      PMM2=20.32
      PMM2 now is responsible for service address 1.1.1.10
   reduce the current capacity rating of the PMM by the load assigned
      PMM2=20.32−5=15.32
      The new PMM list becomes PMM1=13.5
PMM2=15.32
PMM3=8.13
remove the first load rating by address from the list
   Service4, Load Rating 5, Service address 1.1.1.11
   Service3, Load Rating 4, Service address 1.1.1.5
   Service3, Load Rating 4, Service address 1.1.1.6
   Service3, Load Rating 4, Service address 1.1.1.7
   Service3, Load Rating 4, Service address 1.1.1.8
   Service3, Load Rating 4, Service address 1.1.1.9
   Service1, Load Rating 3.3, Service address 1.1.1.1
   Service1, Load Rating 3.3, Service address 1.1.1.2
   Service1, Load Rating 3.3, Service address 1.1.1.3
   Service2, Load Rating 2, Service address 1.1.1.4
repeat
get the first load rating by address=Service4, Load Rating 5, Service address 1.1.1.11
assign this service address to the PMM with the highest current capacity rating
   PMM2=15.32
   Since PMM2 already has a Service4 Service address, select the next highest
   PMM1=13.5
   PMM1 now is responsible for service address 1.1.1.11
reduce the current capacity rating of the PMM by the load assigned
   PMM1=13.5−5=8.5
   The new PMM list becomes
      PMM1=8.5
      PMM2=15.32
      PMM3=8.13
remove the first load rating by address from the list
   Service3, Load Rating 4, Service address 1.1.1.5
   Service3, Load Rating 4, Service address 1.1.1.6
   Service3, Load Rating 4, Service address 1.1.1.7
   Service3, Load Rating 4, Service address 1.1.1.8
   Service3, Load Rating 4, Service address 1.1.1.9
   Service1, Load Rating 3.3, Service address 1.1.1.1
   Service1, Load Rating 3.3, Service address 1.1.1.2
   Service1, Load Rating 3.3, Service address 1.1.1.3
   Service2, Load Rating 2, Service address 1.1.1.4
repeat
get the first load rating by address=Service3, Load Rating 4, Service address 1.1.1.5
assign this service address to the PMM with the highest current capacity rating
   PMM2=15.32
   PMM2 now is responsible for service address 1.1.1.5
reduce the current capacity rating of the PMM by the load assigned
   PMM2=15.32−4=11.32
   The new PMM list becomes
      PMM1=8.5
      PMM2=11.32
      PMM3=8.13
remove the first load rating by address from the list
   Service3, Load Rating 4, Service address 1.1.1.6
   Service3, Load Rating 4, Service address 1.1.1.7
   Service3, Load Rating 4, Service address 1.1.1.8
   Service3, Load Rating 4, Service address 1.1.1.9
   Service1, Load Rating 3.3, Service address 1.1.1.1
   Service1, Load Rating 3.3, Service address 1.1.1.2
   Service1, Load Rating 3.3, Service address 1.1.1.3
   Service2, Load Rating 2, Service address 1.1.1.4
repeat
get the first load rating by address=Service3, Load Rating 4, Service address 1.1.1.6
assign this service address to the PMM with the highest current capacity rating
   PMM2=11.32
   Since PMM2 already has a Service3 Service address, select the next highest
   PMM1=8.5
   PMM1 now is responsible for service address 1.1.1.6
reduce the current capacity rating of the PMM by the load assigned
   PMM1=8.5−4=4.5
   etc.

A further extension to the basic load balancing technique is provided in Example 3 below. Referring to the flowchart of FIG. 5, an additional step (such as Step 514 prior to Step 520) may include the following action: If load balancing with existing service address connections, then reduce the current capacity rating for each PMM in Step 510 by the loads of the service addresses already assigned, make sure that the loads just assigned are not in the address list, then proceed to step 502. The purpose of Step 514 is to rebalance without moving any existing assignments, even if the reconfiguration results in a less-optimal balance. In other words, the intent is to allow the PMMs to continue to properly service the existing connections and only "reload balance" those service addresses that require redistribution because of the loss/failure of a PMM. This alternate embodiment of the inventive balancing method pertains to an established PCC cluster 300 with a suspect PMM that thereby necessitates redistribution and rebalacing of load addresses.

EXAMPLE 3

Assume the final configuration of PMMs and service addresses in Example 1.
   PMM1 (1.1.1.5, 1.1.1.7, 1.1.1.1, 1.1.1.4)
   PMM2 (1.1.1.10, 1.1.1.11, 1.1.1.6, 1.1.1.9, 1.1.1.3)
   PMM3 (1.1.1.8, 1.1.1.2)
The Service Address configuration is the same:
   Service4, Load Rating 5, Service address 1.1.1.10
   Service4, Load Rating 5, Service address 1.1.1.11
   Service3, Load Rating 4, Service address 1.1.1.5
   Service3, Load Rating 4, Service address 1.1.1.6
   Service3, Load Rating 4, Service address 1.1.1.7
   Service3, Load Rating 4, Service address 1.1.1.8
   Service3, Load Rating 4, Service address 1.1.1.9
   Service1, Load Rating 3.3, Service address 1.1.1.1
   Service1, Load Rating 3.3, Service address 1.1.1.2
   Service1, Load Rating 3.3, Service address 1.1.1.3
   Service2, Load Rating 2, Service address 1.1.1.4
The original PMM capacity configuration is the same:
   PMM1=13.5
   PMM2=20.32
   PMM3=8.13
Assume that PMM1 has gone down and a reload is necessary
   PMM1 (1.1.1.5, 1.1.1.7, 1.1.1.1, 1.1.1.4)
   PMM2 (1.1.1.10, 1.1.1.11, 1.1.1.6, 1.1.1.9, 1.1.1.3)
   PMM3 (1.1.1.8, 1.1.1.2)
Load Balance
normalize the new PMM list
   Service4, Load Rating 5, Service address 1.1.1.10
   Service4, Load Rating 5, Service address 1.1.1.11
   Service3, Load Rating 4, Service address 1.1.1.5
   Service3, Load Rating 4, Service address 1.1.1.6
   Service3, Load Rating 4, Service address 1.1.1.7
   Service3, Load Rating 4, Service address 1.1.1.8
   Service3, Load Rating 4, Service address 1.1.1.9

Service1, Load Rating 3.3, Service address 1.1.1.1
Service1, Load Rating 3.3, Service address 1.1.1.2
Service1, Load Rating 3.3, Service address 1.1.1.3
Service2, Load Rating 2, Service address 1.1.1.4

$$PMM2=20.32-5-5-4-4-3.3=-0.98$$

Service4, Load Rating 5, Service address 1.1.1.10
Service4, Load Rating 5, Service address 1.1.1.11
Service3, Load Rating 4, Service address 1.1.1.5
Service3, Load Rating 4, Service address 1.1.1.6
Service3, Load Rating 4, Service address 1.1.1.7
Service3, Load Rating 4, Service address 1.1.1.8
Service3, Load Rating 4, Service address 1.1.1.9
Service1, Load Rating 3.3, Service address 1.1.1.1
Service1, Load Rating 3.3, Service address 1.1.1.2
Service1, Load Rating 3.3, Service address 1.1.1.3
Service2, Load Rating 2, Service address 1.1.1.4

$$PMM3=8.13-4-3.3=0.83$$

The new PMM list is:
PMM2=−0.98
PMM3=0.83
Note that if the cluster of PMMs keep track of their loads dyamically, these computations may be done with the statistics gathered during real-time rather than the static values. As well, if one or more PMMs discover that the dynamic loads being gathered in real-time exceed the static loads by some amount (e.g., a percentage) then the affected PMM 400 may request a rebalance from the PCC Coordinator 350.

The new Service Address list is (assignments to PMM1):
Service3, Load Rating 4, Service address 1.1.1.5
Service3, Load Rating 4, Service address 1.1.1.7
Service1, Load Rating 3.3, Service address 1.1.1.1
Service2, Load Rating 2, Service address 1.1.1.4
balance the new list
get the first load rating by address=Service3, Load Rating 4, Service address 1.1.1.5
assign this service address to the PMM with the highest current capacity rating
PMM3=0.83
PMM3 now is responsible for service address 1.1.1.5
reduce the current capacity rating of the PMM by the load assigned
PMM3=0.83−4=−3.17
The new PMM list becomes
PMM2=−0.98
PMM3=−3.17
remove the first load rating by address from the list
Service3, Load Rating 4, Service address 1.1.1.7
Service1, Load Rating 3.3, Service address 1.1.1.1
Service2, Load Rating 2, Service address 1.1.1.4
repeat
get the first load rating by address Service3, Load Rating 4, Service address 1.1.1.7
assign this service address to the PMM with the highest current capacity rating
PMM2=−0.98
PMM2 now is responsible for service address 1.1.1.7
reduce the current capacity rating of the PMM by the load assigned
PMM2=−0.98−4=−4.98
The new PMM list becomes
PMM2=−4.98
PMM3=−3.17
remove the first load rating by address from the list
Service1, Load Rating 3.3, Service address 1.1.1.1
Service1, Load Rating 3.3, Service address 1.1.1.2
repeat
get the first load rating by address=Service1, Load Rating 3.3, Service address 1.1.1.1
assign this service address to the PMM with the highest current capacity rating
PMM3=−3.17
PMM3 now is responsible for service address 1.1.1.1
reduce the current capacity rating of the PMM by the load assigned
PMM3=3.17−3.3=−6.47
The new PMM list becomes
PMM2=−4.98
PMM3=−6.47
remove the first load rating by address from the list
Service2, Load Rating 2, Service address 1.1.1.4
repeat
get the first load rating by address=Service2, Load Rating 2, Service address 1.1.1.4
assign this service address to the PMM with the highest current capacity rating
PMM2=−4.98
PMM2 now is responsible for service address 1.1.1.4
reduce the current capacity rating of the PMM by the load assigned
PMM2=−4.98−2=−6.98
The new PMM list becomes
PMM2=−6.98
PMM3=−6.47
exit
The resulting solution:
PMM2 (1.1.1.10, 1.1.1.11, 1.1.1.6, 1.1.1.9, 1.1.1.3, 1.1.1.7, 1.1.1.4)
PMM3 (1.1.1.8, 1.1.1.2, 1.1.1.5, 1.1.1.1)
If a more optimal balance can be achieved because the results of the newly balanced configuration are "suspicious", e.g., the spread between PMM2 loading and PMM3 loading is undesirable or service addresses are "clumped", then the inventive technique allows choosing among one or more of the service addresses assigned to PMM2 and/or PMM3, adding them to the list of service addresses to be rebalanced and repeating Example 3.

As a last example, assume that a new PMM or more PCC service addresses are added to a PCC 300 resulting in the need to rebalance. A rebalance may be tempered by the desire to move as few previously assigned service addresses as possible to prevent a temporary loss of service to clients using the services.

EXAMPLE 4 do loading as per Example 3 (with or without clumping prevention);
don't commit the configuration to the PCC yet;
for all combinations:
  take a look at spread and see if there is some movement of a Service Address that would improve the balance;
  check for address distribution violation (clumping);
when all done commit to PCC.
The goals of the examples illustrated above are to produce a reasonable balance of loads across the PCC while maintaining continuity of service, even at the expense of slight sub-optimal balance.

As noted, the proxy cache clustering technique described herein provides a fault-failover mechanism for the PCC. In the event of a failure to a PMM 400, the PCC coordinator 350 proceeds to rebalance the load over the remaining members of the PCC (Examples 1–4) and then continues normal operation under the rebalanced configuration. Clients without open connections to the failed PMM function as though no failure event had occurred. For instance, a browser 110 requesting service at an address of a PMM that is still "up" does not experience an interrupt in service. Clients with open connections to the failed PMM may, however, time out, retry and continue communication without further interruption. At this point, the PCC 300 and clients 120 have fully recovered from the fault.

In summary, the inventive proxy cache cluster (PCC) cooperates with a service provider of a communications network to increase the availability of services offered by the provider to clients connected to the network. By functioning as a system of proxy cache servers defined by a common configuration of PMMs, hosted PCC services and static PCC configuration parameters, the PCC improves availability, performance and scalability of the service provider by, e.g., moving the network addresses serviced by a failed PMM to surviving PMMs of the PCC according to the inventive proxy cache clustering technique.

Scalability of the service provider may be further achieved by adding PMMs, PCC service addresses, and/or PMM network addresses to the PCC. Adding PCC service (IP) addresses means, for instance, adding a new HTTP service address, whereas adding PMM network (IP) addresses means adding a new PMM which has a network address. It should be noted that a situation where scaling does not benefit by the addition of a PMM is when there are fewer PCC service addresses than PMMs. A service address can not be split across a PMM, thus the minimum configuration is a one-to-one relationship between PMMs and PCC service addresses. Although there may be situations where additional PMMs may outnumber the service addresses in a PCC, the only use for these "spare" PMMs is for failover in the event of a faulty PMM.

The minimum configuration of the PCC preferably comprises at least two PMMs, although there is no architectural limit to the number of PMMs that can be assigned to a PCC. The minimum configuration does not lend itself to load balancing in the event of one PMM failing, but if a failure occurs, there is automatic fail-over to the surviving PMM. More than two PMMs is desirable because load balancing can be performed in the event of a failure. In addition, the illustrative configuration of the service provider/web site includes a plurality of web servers 200, each having a PMM resident thereon. Collectively, the PMMs function as front-end entities to "float" all of the network addresses of the service provider 180. Thus if one of the web servers 200 fails or otherwise goes down, its network address is reassigned other PMMs, as described herein.

While there has been shown and described an illustrative embodiment for increasing the availability of services offered by a service provider to clients connected to a communications internetwork in accordance with an inventive proxy cache clustering technique, it is to be understood that various other adaptations and modifications may be made within the spirit and scope of the invention. For example, according to another aspect of the invention, the novel clustering technique provides fault-failover partitioning of a PCC. A desirable artifact of the invention is that a single PCC may split into more than one PCC. If certain members of the PCC lose contact with the rest of the PCC members, the portion of the PCC that does not have a PCC coordinator proceeds to elect a new PCC coordinator and form a new PCC. The PCC with the original PCC coordinator then load balances across the remaining PMMs and continues servicing assigned addresses. This activity occurs despite the number of fragments that a PCC may be partitioned into.

In yet another aspect of the present invention, fault-correction partition merging is provided by the invention. Continuing with the example above, assume the lost portion of the PCC resumes contact with the rest of the PCC members and attempts to rejoin the cluster. An immediate concern is which PCC coordinator becomes the coordinator of the reformed PCC. The invention contemplates determining the busiest cluster and, thereafter, not disturb it so as to minimize perturbation to service. According to an embodiment of the invention, the busiest cluster is determined by examining a most recent service interval (contained in the heartbeat message 310) and the PCC coordinator with the lowest interval becomes the new coordinator.

A service interval is the interval between the last service request and the current service request, e.g., from a browser 110 to a web site 180. The PCC coordinator with the lowest service interval (e.g., 30 ms vs. 500 ms) is assumed to be servicing more traffic so, according to this embodiment, it is elected the new coordinator. Note that other metrics can also be used to determine the new coordinator. The losing coordinator then broadcasts a shutdown restart message to all members of the losing cluster. The new coordinator proceeds to integrate the new PMMs by load balancing according to the clustering technique described herein. The shutdown restart message instructs the PMMs to finish their current work and then transition into a joining mode. The surviving PCC coordinator then balances across those PMMs that are joined.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for increasing the availability of services offered by a service provider to clients connected to a communications network, the clients accessing the services by issuing requests to service addresses associated with these services, the method comprising the steps of:

providing a plurality of processor/memory mechanisms (PMMs) adapted to cooperatively interact in order to receive and service the requests on behalf of the service provider;

organizing the PMMs as one or more proxy cache clusters (PPCs) by dynamically assigning each PMM to one or more PCCs;

balancing the service addresses among PMMs by assigning selected service addresses to each PMM of the PCC; and rebalancing the service addresses among PMMs of the PCC in response to dynamic changes in the PCC.

2. The method of claim 1 wherein the step of organizing comprises the step of configuring each PMM with a unique identifier (ID), a network address and PCC configuration software.

3. The method of claim 2 wherein the step of organizing further comprises the step of notifying each PMM of availability in the PCC using a heartbeat message broadcasted to each member of the PCC.

4. The method of claim 3 wherein the step of organizing further comprises the step of sharing a common configuration among the PMMs that describes the PCC in terms of the PMMs, static PCC configuration parameters and hosted PCC services.

5. The method of claim 4 wherein the step of sharing a common configuration comprises the step of characterizing each hosted PCC service by a load rating value that reflects a measure of the PCC service's resource consumption.

6. The method of claim 4 wherein the step of sharing a common configuration comprises the step of characterizing the hosted PCC services by service type.

7. The method of claim 6 wherein the service type comprises one of a Hypertext Transfer Protocol (HTTP) proxy service, an HTTP accelerator service, a file transfer protocol proxy service, real audio and real video.

8. The method of claim 4 wherein the step of sharing a common configuration comprises the step of characterizing the hosted PCC services by service type parameters that are unique to each service.

9. The method of claim 5 wherein the step of providing comprises the step of characterizing each PMM by a capacity rating value that reflects a measure of the PMM's ability to provide resources.

10. The method of claim 1 wherein the step of balancing the service addresses comprises the step of designating a particular PMM to function as a PCC coordinator to assign the service addresses to the PMMs.

11. The method of claim 10 wherein the step of balancing the service addresses further comprises the step of periodically distributing a message containing the service address assignments from the PCC coordinator to the PMMs.

12. The method of claim 11 wherein the step of periodically distributing comprises the step of uniquely identifying the service address assignment message as issued by the PCC coordinator by marking the message with a stamp.

13. The method of claim 11 wherein the step of providing comprises the step of characterizing each PMM by a role that describes various activities of the PMM as manifested in one of the service address assignment message and the heartbeat message.

14. The method of claim 13 wherein the role comprises an active role in one or more PCCs that allows the PMM to participate in all PCC activities.

15. The method of claim 13 wherein the role comprises an standby role in one or more PCCs that prohibits assignments to the PMM until at least one other PMM in the PCC assumes one of a down or unusable role.

16. The method of claim 15 wherein the unusable role indicates that the PMM cannot be used by the PCC, whereas the down role is automatically assigned by the PCC coordinator upon failure to detect a heartbeat message within a predetermined period.

17. The method of claim 13 wherein the role comprises an active role in one or more PCCs that allows the PMM to participate in all PCC activities and a standby role in one or more PCCs that prohibits assignments to the PMM until at least one other PMM in the PCC assumes one of a down or unusable role.

18. The method of claim 10 wherein the step of providing comprises the step of characterizing each PMM by a primary communication network address for communicating among the PMMs and the PCC coordinator.

19. The method of claim 18 wherein the primary communication network address is the unique ID of the PMM.

20. The method of claim 1 wherein the step of providing comprises the step of characterizing each PMM by an operational status including one of a joining status when the PMM attempts to rejoin the PCC after being offline, an up status after the PCC coordinator accepts the PMM and rebalances the PCC, a leaving status when the PMM becomes unavailable to the PCC and a down status after the PMM is unavailable to the PCC.

21. The method of claim 1 wherein the step of balancing comprises the steps of:
    summing the load ratings of the hosted PCC services;
    calculating the load rating per address for each hosted PCC service;
    creating an address list that is sorted, in decending order, by the calculated load rating per address;
    summing the capacity ratings of the PMMs; and
    calculating a current capacity rating of each PMM normalized to a common load unit metric.

22. The method of claim 1 wherein dynamic changes in the PCC comprises addition or deletion of services.

23. The method of claim 1 wherein dynamic changes in the PCC comprises real-time collection of load data.

24. The method of claim 1 wherein dynamic changes in the PCC comprises failure of a PMM.

25. The method of claim 1 wherein the step of rebalancing comprises the steps of:
    summing the load ratings of the hosted PCC services;
    calculating the load rating per address for each hosted PCC service;
    creating an address list that is sorted, in decending order, by the calculated load rating per address;
    summing the capacity ratings of the PMMs; and
    calculating a current capacity rating of each PMM normalized to a common load unit metric.

26. The method of claim 1 wherein the step of organizing comprises the step of dynamically establishing one or more new clusters that continue to service clients if one or more PMMs loses contact with their original clusters.

27. A computer-readable medium comprising: instructions and data written thereon, said instructions and data containing information for the practice of the method of the claim 1.

28. Electromagnetic signals traveling over a computer network comprising: said electromagnetic signals carrying information for the practice of the method of claim 1.

29. A system for increasing the availability of services offered by a service provider to clients connected to a communications network, the clients accessing the services by issuing requests to network addresses associated with these services, the system comprising:
    a plurality of processor/memory mechanisms (PMMs) cooperatively interacting to receive and service the requests on behalf of the service provider, each PMM characterized by a primary communication address and assigned at least one network address to service;
    means for organizing the PMMs as one or more proxy cache clusters (PPCs) by dynamically assigning each PMM to one or more PCCs; and
    means for balancing service addresses among PMMs by assigning selected service addresses to each PMM of the PCC
    means for rebalancing service addresses among PMMs of the PCC in response to dynamic changes in the PCC.

* * * * *